Feb. 24, 1953 S. D. RUSSELL 2,629,223
SIDE DELIVERY RAKE
Filed June 13, 1946 3 Sheets-Sheet 2

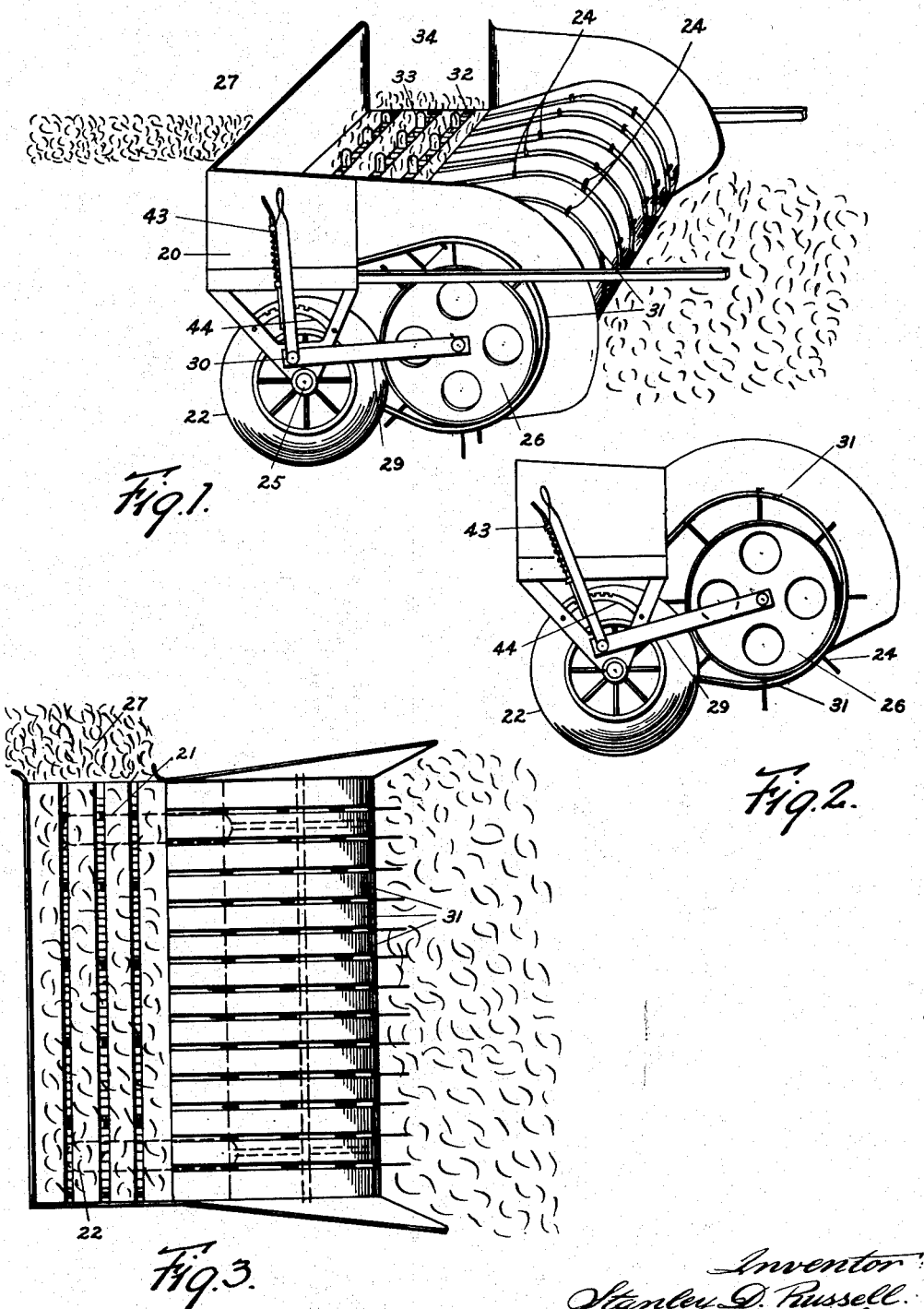

Patented Feb. 24, 1953

2,629,223

UNITED STATES PATENT OFFICE 2,629,223

SIDE DELIVERY RAKE

Stanley D. Russell, Racine, Wis., assignor to J. I. Case Company, Racine, Wis., a corporation of Wisconsin Application June 13, 1946, Serial No. 676,428

7 Claims. (Cl. 56—376)

My invention relates to lateral delivery rakes.

Present day rakes usually consist of a raking reel mounted diagonally to its direction of advance over the ground. Because of the angular disposition of the reel, which rotates counter to its direction of progress, the hay or straw is rolled along the front of the reel and gradually worked towards the end. The hay is therefore left in the form of a windrow as the implement passes over the field. In my side delivery rake a radically different arrangement is utilized. Briefly, the hay is picked up boldly from the field, consolidated on a trough on the implement and then deposited from the trough in a windrow on the ground. My rotary pickup arrangement is disposed at right angles to the direction of progress and the hay is picked up rather than rolled to one side.

One of the objects of my invention is to provide an improved side delivery rake in which a rotary rake, revolving in a direction opposite to that of the ground wheels, picks up the cut material from the swath, carries it forwardly, upwardly and then rearwardly and delivers it to means in the rear of the rake which receives the raked-up material and guides it transversely and delivers it at the side of the rake to form a windrow.

A further object is to provide such a construction in which a rotor on the rake is engageable and disengageable with respect to a ground wheel to enable the rake to be moved to inoperative position for transport.

Further objects and advantages of the invention will be apparent from the description and claims.

In the drawings, in which several embodiments of my invention are shown,

Figure 1 is a perspective view of a side delivery rake, parts being broken away;

Fig. 2 is a side elevational view thereof;

Fig. 3 is a plan view thereof;

Figure 4:
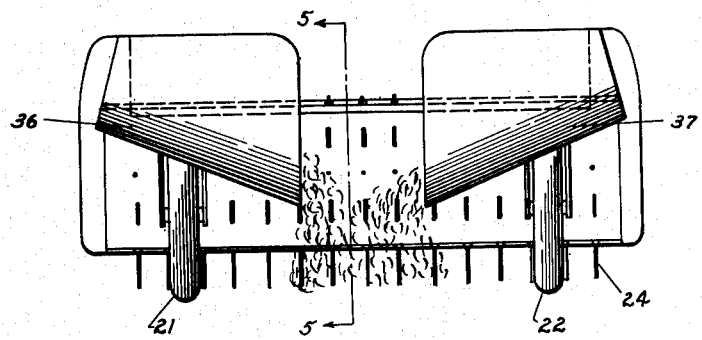
Fig. 4 is a front elevational view of another form of rake.

Referring to the drawings in detail, and first to Figs. 1, 2 and 3, the construction shown comprises a carriage 20 having two laterally spaced coaxial supporting ground wheels, 21 and 22, a rotary rake mounted on said carriage having radially extending spring teeth 24, said rake being rotatable about an axis parallel to and in advance of the ground wheel axis 25, means for rotating said rotary rake in a direction opposite to that of the ground wheels comprising a driven rotor 26 on which the rake teeth 24 are mounted as shown in Fig. 2, engageable and disengageable with respect to the ground wheel 22, and means in the rear of the rake for receiving the raked-up material therefrom and guiding it transversely and delivering it to form a windrow. If desired, any type of apparatus may be provided to prevent a strong wind from blowing away material picked up by the spring teeth 24, such apparatus, for example, as the strips 277 shown in my Patent No. 2,362,861, dated November 14, 1944.

The rotary rake is rotatably mounted on a pair of arms 29, one at each end of the rake, which arms are pivotally mounted on the frame of the carriage at 30. A lever 43 and quadrant 44 are provided for moving the rake carrying arms 29 up or down to bring the rotor into and out of engagement with respect to the ground wheels 21 and 22.

The ground wheels are equipped with rubber tires which increase the friction between the rotor heads during the latter's engagement.

Fig. 1 shows the rake in operative position, in which the rotor 26 is in engagement with the ground wheels. Fig. 2 shows the rotor lifted so as to disengage the ground wheels for transport. A plurality of arcuate stripper guards 31 are provided adjacent the spring teeth of the rake for causing the picked-up material to move radially away from the center of the rake to disengage this material from the radially-extending teeth of the rake just prior to its delivery to the transversely travelling conveyor 32 at the rear of the rake.

This transversely travelling conveyor may be of any suitable type, such as an endless conveyor comprising a plurality of parallel chains having upwardly projecting teeth 33 for engaging the cut material and delivering it through the opening 34 in the conveyor hopper. Any suitable means may be provided for driving this conveyor.

In use, when the raking operation is to be started, the lever 43 is operated to drop the drive rotor 26 into engagement with the ground wheel 22 and the rake is drawn to the right, as viewed in Fig. 1. This will cause the rotary rake to rotate in a counterclockwise direction, raking up the material from the swath, carrying it forwardly, upwardly and then rearwardly and then delivering it to the transversely-extending conveyor which delivers the cut material to form a windrow 27 at one side of the rake.

Figure 6:
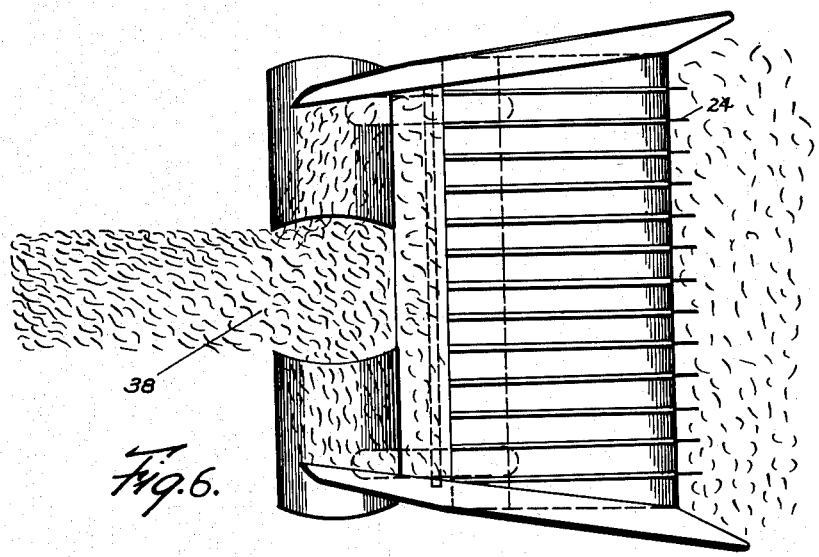
Fig. 6 is a plan view thereof.
Figure 5:
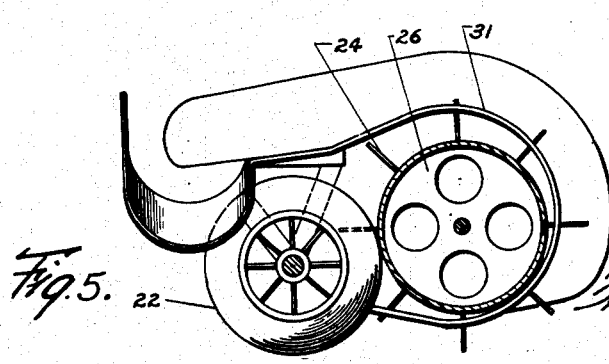
Fig. 5 is a sectional elevational view on the line 5—5 of Fig. 4.

The construction shown in Figs. 4, 5 and 6 is similar to that just described in connection with Figs. 1, 2 and 3, except that the rotary rake delivers the material to a pair of oppositely inclined chutes 36 and 37 which receive the cut material and deliver it in the rear of the central portion of the rake as shown at 38. In this form, the inclined chutes are so short that they may be inclined sufficiently so that gravity will cause the cut material to move toward the central portion of the machine and be discharged to form the windrow. The ground wheels, drive rotor, rotary rake, deflectors and wind guard may be substantially the same as in Figs. 1, 2, and 3.

Figure 7:
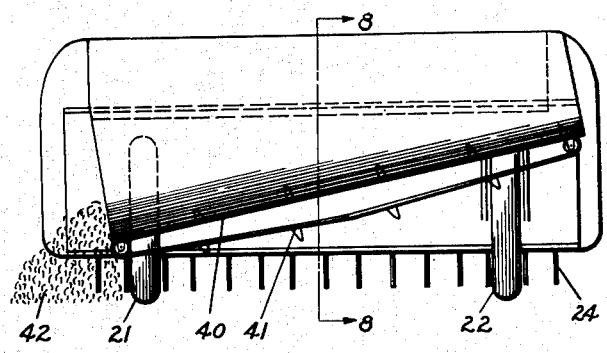
Fig. 7 is a rear elevational view showing another modification.
Figure 8:
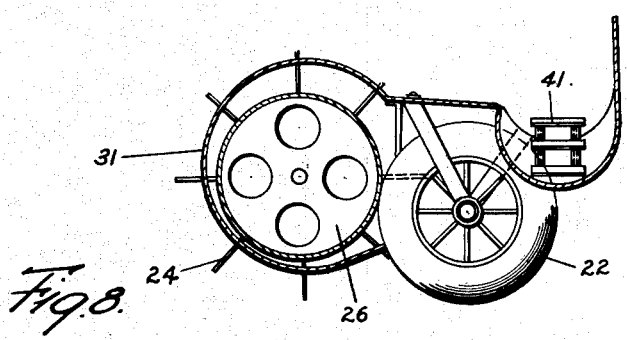
Fig. 8 is a side elevational view of the construction of Fig. 7.

The construction shown in Figs. 7 and 8 is quite similar to that in Figs. 4, 5 and 6, except that here a single inclined chute 40 is provided, to which the cut material is delivered from the rake, and that an endless conveyor is provided to assist gravity in causing the cut material to move down the inclined chute toward the discharge side to form a windrow 42 as shown in Fig. 7.

Figure 9:
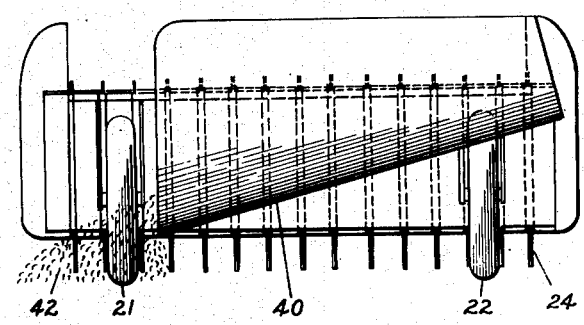
Fig. 9 is a rear elevational view of another form.

The construction shown in Fig. 9 is similar to that shown in Figs. 7 and 8 except that the chute is made shorter, delivering the cut material to form a windrow 42 to the rear of the left end of the rake, as viewed in Fig. 9. This shortening of the conveyor chute enables its inclination to be increased so that in general an endless conveyor is not necessary in order to insure the downward movement of the cut material.

As shown in Figs. 3, 4, 5, 7 and 9, the tines 24 are so spaced as not to interfere with the wheels 22 but rather to straddle or pass on opposite sides thereof.

While the elements shown and described are well adapted to serve the purpose for which they are intended, it is to be understood that the invention is not limited to the precise construction set forth but that it includes within its purview whatever is new and within the spirit of the appended claims.

Further modifications will be apparent to those skilled in the art and it is desired, therefore, that the invention be limited only by the scope of the appended claims.

Having thus described my invention, what I claim and desire to secure by Letters Patent is:

1. A side-delivery rake comprising a carriage having two laterally spaced coaxial supporting ground wheels, a rotary rake mounted on said carriage having radially extending teeth, rotatable about an axis parallel to and in advance of the ground wheel axis, and means for rotating said rotary rake in a direction opposite to that of the ground wheels comprising a driven rotor rotatable with the rotary rake and engageable and disengageable with respect to one of said ground wheels, the sum of the radii of the rake and a wheel being greater than the distance between said ground wheel axis and said rake axis and the distance between said axes being greater than the radius of a wheel.

2. A side-delivery rake comprising a carriage having two laterally spaced coaxial supporting ground wheels, a rotary rake mounted on said carriage having radially extending teeth and rotatable about an axis parallel to and in advance of the ground wheel axis, and means for rotating said rotary rake in a direction opposite to that of the ground wheels comprising a driven rotor rotatable with the rotary rake and means for so mounting said rake on said carriage as to enable the distance between the axis of said rake and the axis of the ground wheels to be varied to engage and disengage said driven rotor with respect to one of said ground wheels, the sum of the radii of the rake and a wheel being greater than the distance between said ground wheel axis and said rake axis and the distance between said axes being greater than the radius of a wheel.

3. A side-delivery rake comprising a carriage having two laterally spaced coaxial supporting ground wheels, a rotary rake mounted on said carriage having radially extending teeth, rotatable about an axis parallel to and in advance of the ground wheel axis, and means for rotating said rotary rake in a direction opposite to that of the ground wheels comprising a driven rotor rotatable with the rotary rake and engageable and disengageable with respect to one of said ground wheels, and means in the rear of the rake and extending above at least one of said wheels for receiving the raked-up material therefrom and guiding it transversely and delivering it to form a windrow, the sum of the radii of the rake and a wheel being greater than the distance between said ground wheel axis and said rake axis and the distance between said axes being greater than the radius of a wheel.

4. A side-delivery rake comprising a carriage having two laterally spaced coaxial supporting ground wheels, a rotary rake mounted on said carriage having radially extending teeth, rotatable about an axis parallel to and in advance of the ground wheel axis, and means for rotating said rotary rake in a direction opposite to that of the ground wheels comprising a driven rotor rotatable with the rotary rake, transmission from one of said ground wheels to said rotor, and means in the rear of the rake and extending across, above and directly over at least a portion of at least one of said wheels for receiving the raked-up material therefrom and guiding it transversely and delivering it to form a windrow.

5. A side-delivery rake comprising a carriage having two laterally spaced coaxial supporting ground wheels, a rotary rake mounted on said carriage having radially extending teeth, rotatable about an axis parallel to and in advance of the ground wheel axis, and means for rotating said rotary rake in a direction opposite to that of the ground wheels comprising a driven rotor rotatable with the rotary rake and engageable and disengageable with respect to one of said ground wheels, said rake having teeth spaced to pass on opposite sides of at least one of said wheels.

6. A side-delivery rake comprising a carriage having two laterally spaced coaxial supporting ground wheels, a rotary rake mounted on said carriage having radially extending teeth, rotatable about an axis parallel to and in advance of the ground wheel axis, and means for rotating said rotary rake in a direction opposite to that of the ground wheels comprising a driven rotor rotatable with the rotary rake and means for so mounting said rake on said carriage as to enable the distance between the axis of said rake and the axis of the ground wheels to be varied to engage and disengage said driven rotor with respect to one of said ground wheels, said rake having teeth spaced to pass on opposite sides of at least one of said wheels.

7. A windrow-forming machine comprising a carriage having two laterally spaced coaxial supporting ground wheels and pickup and delivery apparatus mounted on the said carriage comprising pickup apparatus extending transversely in front of said wheels and across the path thereof for picking up the cut material from the stubble, and delivery apparatus for depositing the picked-up cut material in a windrow on the stubble out of the path of said wheels, said delivery apparatus comprising a transversely extending guide passage extending above, across and directly over at least a portion of at least one of said wheels for receiving the picked-up material and guiding it laterally and depositing it on the stubble.

STANLEY D. RUSSELL.

REFERENCES CITED

The following references are of record in the file of this patent:

UNITED STATES PATENTS

| Number | Name | Date |
|---|---|---|
| 1,021,023 | Walker | Mar. 26, 1912 |
| 1,285,963 | Estep | Nov. 26, 1918 |
| 1,293,517 | Neuhaus | Feb. 4, 1919 |
| 1,847,399 | Innes | Mar. 1, 1932 |
| 1,866,380 | Wagner | July 5, 1932 |
| 2,168,266 | McElwain | Aug. 1, 1939 |
| 2,240,066 | Bingham | Apr. 29, 1941 |
| 2,303,055 | Lardi | Nov. 24, 1942 |
| 2,362,861 | Russell | Nov. 14, 1944 |
| 2,388,861 | McCann | Nov. 13, 1945 |